United States Patent [19]
Hoyer

[11] 3,897,699
[45] Aug. 5, 1975

[54] CHANGE GEAR TRANSMISSION IN GROUP CONSTRUCTION, ESPECIALLY FOR MOTOR VEHICLES IN AGRICULTURE AND CONSTRUCTION

[75] Inventor: Manfred Hoyer, Bergisch Gladbach-Schildgen, Germany

[73] Assignee: Klöckner-Humboldt-Deutz Aktiengesellschaft, Cologne, Germany

[22] Filed: Sept. 10, 1973

[21] Appl. No.: 395,766

[30] Foreign Application Priority Data
Sept. 9, 1972  Germany............................ 2244342

[52] U.S. Cl. ..................... 74/745; 74/700; 74/701; 74/360
[51] Int. Cl. .......................... F16h 3/08; F16h 37/08
[58] Field of Search .............. 74/700, 701, 745, 360

[56] References Cited
UNITED STATES PATENTS

| | | | |
|---|---|---|---|
| 2,749,772 | 6/1956 | O'Malley | 74/700 X |
| 2,920,504 | 1/1960 | Sommer | 74/745 |
| 2,972,899 | 2/1961 | Wiggermann | 74/360 X |
| 2,975,656 | 3/1961 | Haverlender | 74/745 |
| 3,744,345 | 7/1973 | Keienburg et al. | 74/745 |

FOREIGN PATENTS OR APPLICATIONS

| | | | |
|---|---|---|---|
| 1,225,969 | 9/1966 | Germany | 74/745 |
| 1,071,494 | 5/1958 | Germany | 74/745 |
| 1,004,053 | 3/1957 | Germany | 74/700 |
| 243,182 | 6/1946 | Switzerland | 74/745 |
| 192,260 | 10/1957 | Austria | 74/700 |

*Primary Examiner*—Samuel Scott
*Assistant Examiner*—P. S. Lall
*Attorney, Agent, or Firm*—Walter Becker

[57] ABSTRACT

A change gear transmission, especially for an agricultural or construction vehicle having an engine. The transmission has a geared first unit having a drive shaft driven by the engine and geared to a countershaft by gear pairs that provide a plurality of velocity ranges for the countershaft. The transmission has a geared second unit with two input shafts and an output shaft. The input shafts are geared to the countershaft to be driven at a plurality of velocity ranges and at least one input shaft is reversible. Gearing connects the input shafts to the output shaft for driving the output shaft at a plurality of velocity ranges in each direction. The transmission may have one or more power take-off shafts. Couplings and clutches are provided for making the paths for power flow to the output shaft selectively effective and controls are provided for actuating the couplings and clutches in the proper combinations.

28 Claims, 4 Drawing Figures

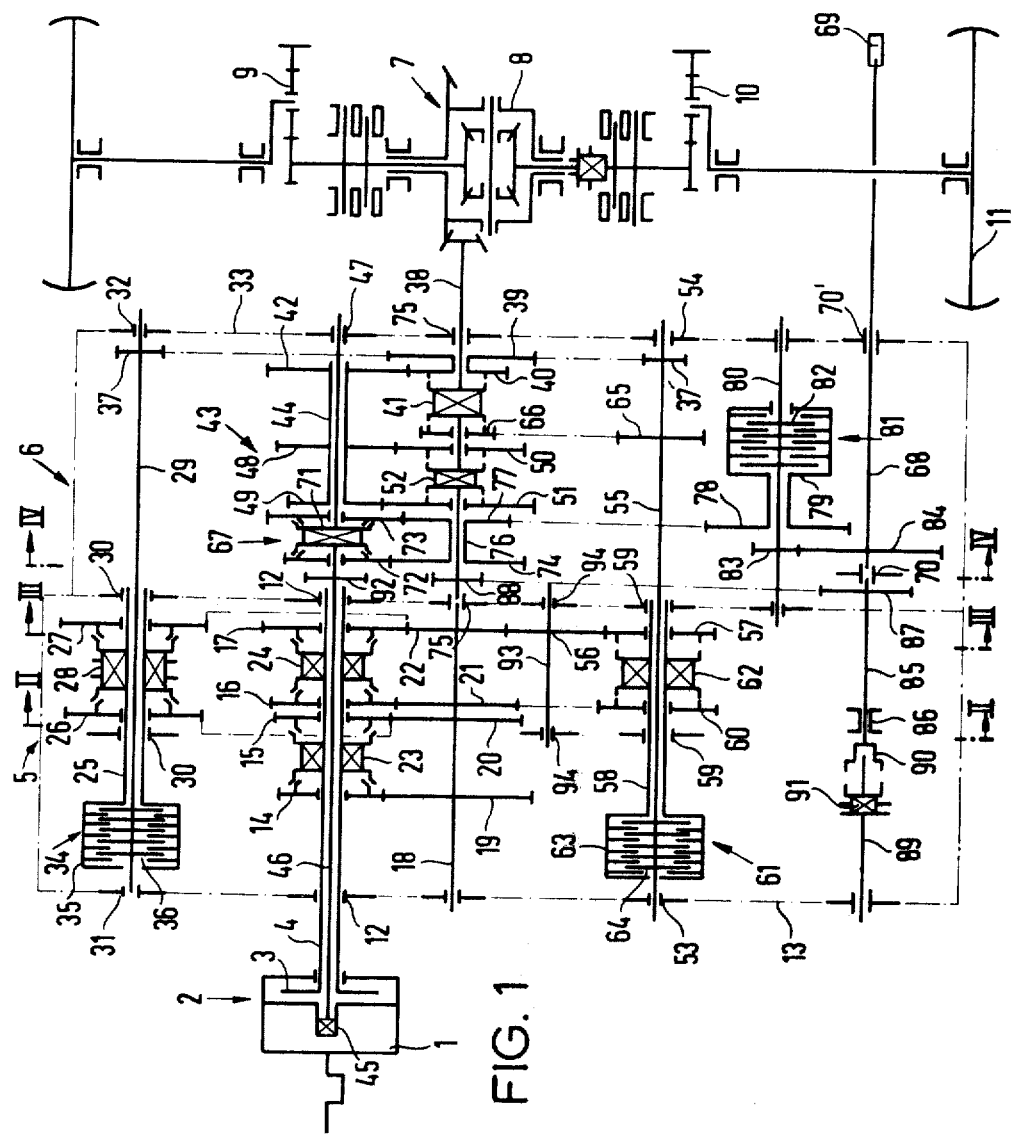

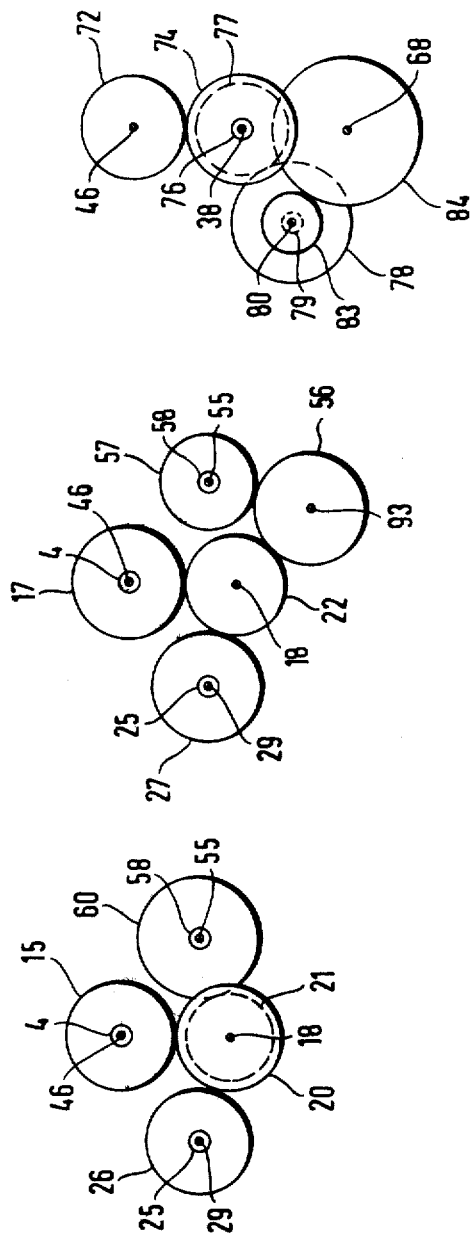

CHANGE GEAR TRANSMISSION IN GROUP CONSTRUCTION, ESPECIALLY FOR MOTOR VEHICLES IN AGRICULTURE AND CONSTRUCTION

The present invention relates to change gear transmissions in group construction, especially for motor vehicles which are used in agriculture and construction and which are equipped with a plurality of reversing stages and with a group transmission which follows a main gear group and is equipped with two input shafts parallel to the output shafts of said last mentioned group transmission while one input shaft is adapted to be driven by a gear of a shaft directly in forward direction, which last mentioned shaft forms the output and- /or counter shaft of the main change gear group.

With change gear transmission of the above mentioned type, it is known in order to provide two reverse speed stages which can be preselected by actuation of a control lever of the group transmission, to drive one of the two input shafts of the group transmission while bypassing the power flow of the main gear group through a gear or a plurality of gears directly by means of the input shaft of the main gear group in rearward direction. While such transmission offers the possibility of associating with the forward speed changes of the main change group equally fast particularly favorable reverse speed stages for the loading operation, experience has shown with these heretofore known change gear transmissions that they are not suitable for use within a speed range of from approximately 0.9 to 9 kilometers per hour for planting and cultivating operations as well as for plowing in agriculture. This is due to the fact that a sufficient stepping of the speed change rates is lacking which are obtainable with the preselectable forward and rearward reversing speed changes.

Experience has furthermore shown that with the heretofore known change gear transmissions transporting and harvesting work cannot be carried out at an optimum rate within a speed range of from approximately 3 to 20 kilometers per hour or at a maximum of 30 kilometers per hour. This is due to the fact that the stages of the group transmission do not offer therefor sufficient possibility. Moreover, when employing an assumed change gear transmission in agriculture, it has been found that for certain employment instances, especially during plowing operation, it is desired from an engaged speed change of the change gear transmission to be able to carry out speed jumps by approximately 30% in the direction of an increase or reduction of the absolute driving speed. Moreover, it has been found that when employing the above mentioned change gear transmission in agriculture and also in construction work with a loading device attached in the front or rear of the motor vehicle, economical loading periods cannot be realized. This is due to the fact that a fast start and slow movement into the material to be loaded, and also a fast transport is not possible, because the reversing speed adapted to be realized with the change gear transmission will not suffice in order to be able to associate an optimum reverse speed stage with each forward speed stage of the main change gear group.

Starting from this finding, it is an object of the present invention to improve and widen the field of employment for a change gear transmission of the above mentioned type by structurally simple means so that maximum and minimum speeds required for the above mentioned fields of employment are obtainable in a wide preselected range with a fine stepping of the velocity stages and with a satisfactory degree of efficiency of the transmission. In this connection, it is to be noted that the change gear transmission should furthermore offer the possibility of widening the field in that by control devices it should be possible selectively either in forward driving direction or in rearward driving direction to carry out positive and negative velocity jumps with an increase or a reduction in the absolute driving speed by approximately 30% under load.

It is another object of this invention so to improve a change gear transmission that it will offer the possibility of having an optimum rearward speed available for each forward speed stage of the main control group and a reversing of the driving direction in all velocity stages will be preselectable under load by means of a control lever or the like which is operable individually.

It is still another object of this invention to provide a change gear transmission of the above mentioned type in which the change gear transmission if necessary will afford the possibility of utilizing additional control elements. By means of such control elements there is provision made in case of failure of the starter for the driving engine or in case of failure of the pressure fluid supply to operate, by means of elements which are shiftable under load to enable a holding or partial further use of a considerable portion of the transmission not only for forward drive but also for rearward drive.

These and other objects and advantages of the invention will appear more clearly from the following specification in connection with the accompanying drawings, in which:

FIG. 1 diagrammatically illustrates a change gear transmission according to the present invention.

FIG. 2 is a section taken along the line II — II of FIG. 1.

FIG. 3 is a section taken along the line III — III of FIG. 1.

FIG. 4 is a section taken along the line IV — IV through the change gear transmission according to FIG. 1.

These objects have been realized according to the present invention by the fact that the input shaft of the group transmission which is adapted to be driven in rearward direction is adapted selectively to be driven by means of the shaft designed as output shaft and/or counter shaft of the main control group through a reversing gear in rearward direction as well as selectively directly in forward direction through a stepup or reducing transmission. A change gear transmission of this design will with a corresponding design of the main control group bring about not only an increase in the preselectable rearward speed stages but is also characterized in that with simple means in the transmission art it offers the possibility to associate with a slow forward speed change of the group transmission in its velocity range, rearward speed changes which are faster by from 20 to 30% and also to associate with a faster speed of the group transmission rearward speed stages which are equally fast or faster by approximately 20%. Due to this possibility of the optimum selection of forward and rearward speed changes, it is thus possible, especially during load operation, to bring about an adaptation of the forward as well as the rearward or reverse speeds to the given conditions of operation.

A particularly economic solution of the change gear transmission according to the present invention is realized by the fact that the gear which serves for driving the input shaft of the group transmission in rearward driving direction, which gear pertains to the shaft serving as output or countershaft of the main transmission group, serves at the same time for selectively driving the other input shaft of the group transmission. This gear change transmission is furthermore characterized in that the power flow between the shaft serving as output and/or counter shaft of the main control group, and the two input shafts of the group transmission is separable selectively. For creating rearward speed stages which are particularly favorable for loading operations and in order to create an economic manufacture of such rearward or reverse speed changes, it is expedient for driving the input shaft of the group transmission, which input shaft is operable in rearward driving direction, to employ a gear which forms part of the fastest speed stage of the main control group and the shaft of which forms an output and/or counter shaft.

For purposes of widening the velocity range of the change gear transmission according to the invention, it is furthermore suggested that the input shaft of the group transmission which is adapted to be driven in forward direction only and pertains to a shaft designed as output and/or counter shaft of the main group and is driven by a gear, is adapted selectively to be driven by an additional gear of the shaft forming an output and/or counter shaft of the main group, and is driven directly in forward driving direction at a different transmission ratio, preferably at a higher transmission rate. For control technical reasons, it is expedient that the transmission ratio between the first gear of the input shaft of the group transmission, which input shaft is adapted to be driven only in forward driving direction, on one hand, and the gear which serves the drive of said first gear as well as the output operation of the other input shaft and which pertains to the shaft which serves as output and/or counter shaft of the main group, is designed smaller than the transmission ratio between the second gear of the input shaft which is adapted to be driven only in forward driving direction and the additional gear which meshes with said second gear and pertains to the shaft designed as output and/or counter shaft of the main control group.

For creating optimum stages of the speed changes or velocity stages adapted to be controlled by the gear change transmission, a further development of the invention provides a transmission stage which is formed by a gear of the input shaft selectively drivable in rearward direction and pertaining to the group transmission; the shaft serves with said gear in forward driving direction as output and/or counter shaft of the main gear group and the same is located between the two transmission stages which are formed by the two gears of the input shaft. The input shaft is operable only in forward driving direction and pertains to the group transmission. In cooperation the two gears which serve for driving said last mentioned input shaft as output and/or counter shaft of the main gear group. An economic solution of the change gear transmission according to the invention is realized by the fact that the gear which serves for the selective drive of the input shaft in forward direction through the reversing gear and which serves as output and/or counter shaft forms a part of the last but one speed stage of the main control group.

A particularly economical manufacture of the change gear transmission is obtained because all gears serve for driving the two input shafts and pertain to the shaft designed as output and/or counter shaft to form part of a speed stage of the main gear group.

According to a further development of the invention, it is provided that the gears of the main gear group which serve for driving each one of the two input shafts of the group transmission are connected to the shaft of said last mentioned gears, which shaft serves as output and/or counter shaft.

According to a further development of the invention, it is provided that the gears of the main gear group, which gears are provided for driving each one of the two input shafts of the group transmission, are non-rotatably connected to the shaft supporting said last mentioned gears and serving as output and/or counter shaft. Furthermore, those gears of the two input shafts of the group transmission which are associated with said first mentioned gears of the main gear group are mounted on a hollow shaft section which is arranged coaxial to said last mentioned input shaft and are selectively engageable with said hollow shaft portion. Each of the two hollow shaft sections is adapted selectively by means of a preferably engageable and disengageable friction clutch to be coupled to the associated input shaft. In this way, it is possible in an advantageous manner to bring about an increase or a reduction in speed without using the driving clutch for the change gear transmission. Thus, with a preselected velocity stage of the main gear group, it is possible by selectively engaging the two friction clutches of the two input shafts, from one of the two control stages adapted to be formed with said friction clutches, under load to change over to one stepup to stepdown control stage.

For purposes of obtaining a construction which is compact as to length and as to height, it is provided that the friction clutch associated with each of the two input shafts is preferably designed as hydraulically engageable and by spring force disengageable friction clutch which is located within the housing of the main gear group. For forming a particularly easily shiftable group transmission, it is furthermore suggested that for selectively coupling the hollow shaft part with its two gears, which hollow shaft part is coaxial with the input shaft that is adapted to be driven in forward direction only, there is provided a control member which is preferably equipped with synchronizing means and is common to said last mentioned two gears.

A particularly simple control of the change gear transmission according to the present invention is realized by the fact that the control members intended for coupling the two hollow shaft parts with their associated gears have associated therewith a common engaging and disengaging member which may for instance have the form of a control lever or the like and which at the same time is adapted to regulate the friction clutches associated with the hollow shaft parts. For control and technical reasons, it is expedient that the engaging and disengaging member which is common to the two control members of the two hollow shaft parts of both input shafts pertaining to the group transmission is guided in an H-shaped control coulisse.

In order, in case of a failure of the pressure fluid supply for the friction clutches of both input shafts to permit a towing of the tractor or to permit the further use of the transmission branch which is associated with the input shaft that is operable selectively in rearward driving direction, it is provided according to a further development of the invention that the input shaft which is operable in rearward driving direction is adapted to be coupled to the hollow shaft surrounding the same, while such coupling operation may be effected selectively by means of an engageable and disengageable friction clutch and also selectively by means of a control sleeve or the like. In this connection, expediently the clutch formed by a control sleeve or control jaw is adapted for connecting the hollow shaft with the input shaft operable in rearward driving direction, to be controlled by means of a control element which is operable by itself.

For building an economical easily shiftable group transmission of the change gear transmission according to the invention, it is suggested that each of the two input shafts of the group transmission include a non-rotatable, preferably the same gear which has associated therewith a common gear that is freely rotatable on the output shaft of the group transmission and which is adapted selectively directly or indirectly to be coupled to said output shaft. In this connection, a plurality of control stages of the group transmission can be realized in a simple manner by the fact that the input shaft of the group transmission which is selectively operable in forward as well as in rearward or reverse driving direction has arranged thereon a further gear which is non-rotatably connected to said last mentioned input shaft and has a greater pitch diameter than the other gear of said last mentioned input shaft, which other gear meshes with a gear of the output shaft of the group transmission. said further gear, which is fixedly connected to said first mentioned input shaft, meshes with a gear which is freely rotatable on the output shaft of the group transmission and is selectively engageable therewith.

For purposes of forming optimum crawl speed stages which are associated with the respective conditions of operation, it is suggested according to the invention that the freely rotatable gear which is common to the two gears of the two input shafts of the group transmission has its output shaft non-rotatably connected to an adjacent gear which has a smaller pitch diameter and which meshes with a gear that is non-rotatably mounted on an auxiliary shaft. This arrangement is furthermore characterized in that the auxiliary shaft has a further gear which has a smaller pitch diameter and which meshes with a gear that is freely rotatably mounted on the output shaft of the group transmission and is selectively engageable therewith.

A particularly favorable number of crawl speed stages can be realized by providing the auxiliary shaft of the group transmission in addition to its output gear with two gears which are non-rotatable and have divergent pitch diameters. Each of these gears meshes with an associated gear that is freely rotatable on the output shaft of the group transmission and is selectively engageable with said output shaft. In this connection, for control and technical reasons, it is expedient that the two gears of the output shaft of the group transmission which are adapted to be driven by the auxiliary shaft are adapted to be coupled to the output shaft by means of a control member common to both of said gears.

A particularly favorable design of the group transmission of the change gear transmission according to the invention is furthermore obtained by an arrangement according to which that gear of the output shaft of the group transmission which is driven by the non-rotatable gear having the greater pitch diameter and pertaining to the input shaft operable in rearward driving direction is located between the gears which pertain to the output shaft of said group transmission and are driven by the auxiliary shaft, on one hand, and the gears for driving said auxiliary shaft on the other hand.

The control of the group transmission of the change gear transmission is furthermore favorably influenced by a design according to which the two freely rotatable gears of the group transmission which mesh with the associated non-rotatable gears of the input shaft of the group transmission, which input shaft is operable in rearward and forward driving direction, are adapted by means of the common control member to be coupled to the output shaft pertaining to said control member. In this connection, a particularly easy shiftability of the group transmission can be realized that the control members which are associated with the gears freely rotatable on the output shaft of the group transmission are under the influence of a common engaging and disengaging element which may be designed as a shift lever.

Within the framework of the present invention, for further reducing the manufacturing costs of the change gear transmission, it is provided that the two input shafts of the group transmission and the input shaft of the main gear group to the shaft which serves as output and/or counter shaft are arranged on a common pitch circle. For manufacturing reasons, it is expedient that the shaft of the reversing gear arranged between the shaft designed as output and/or counter shaft and pertaining to the main gear group on one hand and the input shaft operable in rearward driving direction on the other hand together with the input shaft of the main gear group to the shaft designed as output and/or counter shaft of the input shaft are located on a common pitch circle. It is furthermore expedient for the manufacture of the change gear transmission according to the present invention that the output shaft of the group transmission is in a manner known per se arranged coaxial to the shaft of the main gear group designed as output and/or counter shaft. In this connection, and in conformity with the present invention, the auxiliary shaft of the group transmission is arranged coaxially with regard to the input shaft of the main control group. If the change gear transmission is provided with an auxiliary drive shaft that is dependent on the speed of the driving engine and is arranged coaxially with regard to the input shaft of the main control group, and if said change gear transmission according to the invention is furthermore provided with a power take off which is adapted to be driven by said auxiliary shaft, it is suggested according to the present invention that the output shaft of the group transmission serves as mounting for a gear or a plurality of gears of the gear transmission pertaining to said power take off. In this connection, it is expedient that the power take off shaft of the power take off and the input shaft of the main control group to the shaft designed as output and/or counter shaft for said main control group are arranged on a common pitch circle. If the change gear transmission for the power take off is provided with a gear transmission forming a multi-stage gear transmission, it is furthermore suggested that the gears for forming the gear stages of the multi-stage gear transmission are mounted on te auxiliary drive shaft and the output shaft of the group transmission respectively. For control technical reasons, it is expedient that the control member of the gear transmission, which is designed as a multi-stage transmission and pertains to the power take off, is arranged on the auxiliary drive shaft in a non-rotatable manner but is axially displaceable. A particularly simple control of the multi-stage transmission of the power take off is in conformity with the present invention realized by a design which is characterized in that a friction clutch, which is associated with the power take off shaft operable in conformity with the speed of the driving engine, is arranged in the power flow between the gear transmission and the power take off shaft. Moreover, a solution which is very favorable as to space and the transmission technique is obtained due to the fact that the drive of the power take off shaft is effected by the multi-stage gear transmission through an intermediate shaft which latter comprises a gear meshing with the gear of the power take off shaft and also comprises a gear which has a greater pitch diameter than said last mentioned gear. This gear of greater pitch diameter meshes with one of two gears which are freely rotatably mounted on the output shaft of the gear transmission of the power take off drive. In addition thereto, for creating a compact construction which is favorable from a transmission technical standpoint, it is advantageous that the friction clutch for interrupting the power flow of the power take off drive is arranged on the intermediate shaft of said power take off drive and is located in the power flow between the gears of said power take off drive. For purposes of economically manufacturing the power take off drive, it is furthermore advantageous that the intermediate shaft with the power take off shaft are arranged on a pitch diameter which is common with the pitch diameter of the shaft designed as output and/or counter shaft and pertaining to the main control group.

Finally, a particularly favorable solution from a transmission technical standpoint for an auxiliary drive which is selectively driving dependent has been realized according to the present invention by the fact that the output shaft of the group transmission comprises a gear for the driving dependent drive which gear meshes with a gear of an auxiliary shaft, said gear being coaxially arranged with the power output shaft. The gear for the driving dependent drive is located between the gear mounted on the output shaft of the group transmission and the gears which are mounted on said last mentioned output shaft and pertain to the power output drive which is driven in conformity with the driving speed of the engine, on one hand, and the main control group on the other hand.

Referring now to the drawings in detail, the arrangement illustrated in FIGS. 1 to 4 comprises a flywheel 1 of a driving machine or tractor (not illustrated in detail). This flywheel 1 is keyed to a friction clutch 2 adapted to be engaged and disengaged and serving as driving clutch. The friction clutch has a follower 3 which is non-rotatably connected to a hollow input shaft 4 of a main control group 5 of the change gear transmission according to the invention. This main control group 5 is followed by a multi-step group transmission 6 from which the drive of a driving axle differential 8 is effected through the intervention of an axle shaft drive 7. The differential 8 is adapted to drive a planetary gear transmission 9, 10 by means of which drive wheels 11 are driven.

The input shaft 4 of the main control group 5 is arranged on both sides in a bearing 12 of the dot-dash indicated housing 13 of the main control group 5. Provided on the input shaft 4 are freely rotatable gears 14, 15, 16 and 17 which mesh with an associated gear 19; 20; 21; 22 non-rotatably arranged on an output shaft of the main gear group 5, said output shaft being designed as a counter shaft 18. Between the gears 14, 15 on one hand and 16, 17 on the other hand, there is non-rotatably arranged a double control sleeve 23, 24 which is equipped with synchronizing elements. This sleeve is axially displaceably arranged on the input shaft 4. The sleeves 23 and 24 are operatively connected to a non-illustrated common shift lever for the main control group 5 which lever is preferably guided in an H-shaped control coulisse. By means of the double control sleeve 23, the velocity stages I and II of the main control group 5 to be controlled, said stages I and II being formed by the gears 14, 19; 15, 20. The velocity stages III and IV formed by the gears 16, 21; 17, 22 are shifted by the double control sleeve 24.

The gears 20 and 22 of the counter shaft 18 mesh with gears 26, 27 which are freely rotatable on a hollow shaft part 25 which is parallel to said counter shaft 18. The two gears 26 and 27 are in a gear group L and H respectively adapted by means of a double control sleeve 28 equipped with synchronizing elements to be coupled selectively to the hollow shaft part 25. The transmission ratio of the control stage L of the group transmission 6 which is formed by the two gears 22 and 27 is lower than the transmission ratio for the control stage H which last mentioned transmission ratio is due to the two gears 20, 26. The hollow shaft part 25 is arranged in bearings 30 coaxially with one input shaft 29 of the group transmission 6, said input shaft 29 being operable in forward driving direction only. The input shaft 29 is with the input shaft 4 of the main control group 5 for the counter shaft 18 mounted and arranged in a common circle in a bearing 31 of the housing 13 of the main control group 5 and in a bearing 32 of the housing 33 of the group transmission 6. Between the hollow shaft part 25 and the input shaft 29, in the path of the power flow, there is provided according to the invention a hydraulically engageable friction clutch 34 which is adapted to be disengaged by spring force. This friction clutch 34 whose pressure fluid inlet flow and outlet flow is controlled by a controlling device which is controlled by a non-illustrated control element serving at the same time for shifting the double control sleeve 28, has a primary part 35 which is non-rotatably connected to the hollow shaft part 25. The friction clutch 34 furthermore has a secondary part 36 which is non-rotatably mounted on the input shaft 29. The input shaft 29 furthermore comprises a non-rotatable gear 37 which meshes with a freely rotatable gear 39 arranged on an output shaft 38 of the group transmission 6. The gear 39 is through a hollow shaft part non-rotatably connected to a gear 40 of smaller pitch diameter which gear 40 is adapted selectively by means of a double control sleeve 41 to be coupled to the output shaft 38 in a control stage A for a medium velocity range of the group transmission 6.

The gear 40 of the output shaft 38 of the group transmission 6 meshes with the gear 42 of a crawl transmission 43. The crawl transmission 43 is provided with an auxiliary shaft 44 that is non-rotatably connected to the gear 42. The auxiliary shaft 44 is arranged coaxially with the drive shaft 4 in the housing 33 of the group transmission 6 and is located on an auxiliary drive shaft 46 which is adapted selectively to be driven through a dog 45 in conformity with the speed of the driving engine. The auxiliary drive shaft 46 is on its left hand side located in the flywheel 1 and on the right hand side is located in a bearing 47 of the housing 33. The crawl transmission 43 furthermore has gears 48 and 49 which are of a smaller pitch diameter than that of gear 42 and which are non-rotatably connected to the auxiliary shaft 44 while meshing with a gear 50, 51 which is freely rotatable on the output shaft 38. Between the two gears 50 and 51 there is provided a double control sleeve 52 which is non-rotatably mounted and axially displaceably arranged on the output shaft 38. By means of the double control sleeve 52, it is possible to couple the gears 50, 51 in one control stage K and control stage Z of the group transmission 6 relative to the output shaft 38. The lowest control stage K is formed by the gears 49, 51 and 39, 40 42 of the group transmission. On the other hand, the control stage Z is formed by the gears 39, 40, 42 in cooperation with the gears 48, 50.

In addition to the described structural elements, the group transmission 6 comprises an input shaft 55 which is journalled in a bearing 53 of the housing 13 and in a bearing 54 of the housing 33. This input shaft 55 is adapted selectively to be driven in forward and rearward driving direction. The input shaft 55 is to be driven in a rearward or reverse control stage R by a gear 22 of the counter shaft 18. The gear 22 meshes with the reversing gear 56 which in its turn meshes with the gear 57 which latter is freely rotatable and selectively engageably mounted on a hollow shaft 58. The reversing gear 56 is non-rotatably arranged on a reversing shaft 93 which is journalled in bearings 94. The hollow shaft 58 is coaxially arranged with regard to the input shaft 55 and is adapted selectively to be coupled. In a forward speed stage V whose transmission ratio lies between the two transmission ratios obtainable by the double control sleeve 28 in connection with control stages H and L pre-selectable by the friction clutch 34, the input shaft 55 is adapted to be driven by the counter shaft 18 through the gear 21 thereof and a gear 60 meshing therewith. The gear 60 is freely rotatably mounted on the hollow shaft 58 and is adapted selectively to be coupled. Said hollow shaft 58 is in its turn adapted by means of a hydraulically engageable and by spring force disengageable friction clutch 61 to be coupled to the input shaft 55. The control of the two control stages R and V is effected by means of a double control sleeve 62 which is preferably provided with synchronizing means and is arranged between the two gears 57 and 60. The control means for the double control sleeve 62 and for the control member of the friction clutch 63 are likewise by the control member for controlling simultaneously the control of the double control sleeve 28 and the control of the controlling device for the friction clutch 34 brought into operative connection with said control member in such a way that the control of the control stages L, H and V as well as R can be carried out by a non-illustrated common control lever which is preferably designed in an H-shaped control coulisse. The friction clutch 61 has a primary part 63 which is connected to the hollow shaft 58 and also has a secondary part 64 which is non-rotatably coupled to the input shaft 55. Mounted on the input shaft 55 is a gear 37' which is non-rotatably connected to said shaft 55. This gear 37' meshes with the gear 39 and drives the same in the control stages R and V. Furthermore, non-rotatably connected to the input shaft 55 is a gear 65 which is somewhat larger as to its pitch diameter than the gear 37' and meshes with a gear 66 which is freely rotatable on the output shaft 38. The gear 66 is by means of a double control stage 41 adapted in the control stage S of the group transmission selectively to be coupled with the output shaft 38 of said group transmission.

Furthermore, the change gear transmission according to the invention has a power take off shaft 68 with a shaft section 69. This shaft 68 is adapted selectively by means of a gear transmission 67 to be driven in conformity with the speed of the driving engine through the intervention of the auxiliary drive shaft 46. The power take off shaft 68 is preferably journalled at both sides in bearings 70 with a common pitch circle common with the input shaft of the group transmission 6 and the drive shaft 4 of the main control group 5, said pitch circle being common with the counter shaft 18. The gear transmission 67 has two gears 72, 73 which are freely rotatably journalled on the auxiliary shaft 46 and which are adapted selectively by a double clutch sleeve 71 preferably equipped with synchronizing elements to be coupled to said sleeve 71. For driving the power take off shaft 68 at a normal speed of $n = 540$ RPM, the gear transmission 67 is provided with a gear meshing with the gear 72. Gear 74 is on the output shaft 38 journalled on both sides in bearings 75 connected through a hollow shaft part 76 mounted on shaft 38, in a non-rotatable manner to an adjacent gear 77 of smaller pitch diameter, said gear 77 being driven in the control stage for the power take off normal speed of $n = 1000$ RPM through the intervention of gear 73. A gear 78 meshes with the gear 77 and is connected to the primary part 79 of a friction clutch 81 which is mounted on an intermediate shaft 80 and is adapted to be engaged and disengaged. The intermediate shaft 80 is in its turn preferably with its input shaft 55 to the counter shaft 18 arranged on a common pitch circle. The friction clutch 81 which preferably is designed as hydraulically engageable friction clutch and as friction clutch disengageable by spring force, serves for separating or interrupting the power flow between the auxiliary drive shaft 46 and the power take off shaft 68. Furthermore, the friction clutch 81 has a secondary part 82 which is non-rotatably connected to the intermediate shaft 80, which latter has mounted thereon in a non-rotatable manner a gear 83 having a smaller pitch circle than the gear 78. The gear 83 of the intermediate shaft 80 meshes with a gear 84 which is non-rotatably mounted on the power take off shaft 68.

In addition to driving the axle shaft drive 7, the output shaft 38 of the group transmission 6 serves for driving an auxiliary shaft 85 in conformity with the driving speed. The auxiliary shaft 85 is on its left hand side journalled in bearing 86 and on its right hand side in a bearing means 70, 70' and has a non-rotatable gear 87 arranged thereon. The gear 87 meshes with a gear 88 which is arranged between the gear transmission 67 and the main control group 5 in a non-rotatable manner on the output shaft 38. From the auxiliary shaft 85 the drive of a shaft portion 89 of a non-illustrated front drive axle is effected through a coupling part 90 which is located on the end face and which is adapted by means of a clutch jaw 91 on the shaft portion 89 to be coupled to the latter.

In addition thereto, the change gear transmission according to the invention is equipped with a gear 92 which is located between the bearing 12 of the input shaft 4 and the gear transmission 67 of the power take off drive and is non-rotatably arranged on the auxiliary drive shaft 46. The gear 92 drives a non-illustrated pressure fluid pump for supplying the friction clutches 34, 61 and 81 and also serves for supplying lubricant to the main control group 5 and the group transmission 6 and the next following transmission parts.

It may also be mentioned that if necessary with the change gear transmission according to the invention, on the right hand side of the hollow shaft part 58 there may be provided a clutch part 91 or the like. By means thereof selectively the hollow shaft part 58 in case of a failure of the friction clutch 68 is adapted to be coupled to a corresponding jaw of the input shaft 55. In this way, a towing of the driving engine or tractor and a partial use of the gear change transmission is still possible if and when the pressure fluid supply to the clutches 34 and 61 fails.

It is, of course, to be understood that the present invention is, by no means, limited to the specific showing in the drawings but also comprises any modifications within the scope of the appended claims.

What is claimed is:

1. A gear change and reversing transmission in group construction including a main shifting group with several forward shifting steps following a group drive and driven selectively directing in forward driving direction at diverging stepped-up and stepped-down ratios, especially for agricultural and construction vehicles and comprising: a main geared unit having drive shaft means adapted for being driven by a prime mover and having a countershaft (18) parallel to the drive shaft means, a second geared unit having a first input shaft (29) and a second input shaft (55) and an output shaft (38) all parallel to said drive shaft means, first meshing gears on said drive shaft means and countershaft (14, 19; 15, 20; 16, 21; 17, 22) and adapted to be made selectively effective to drive said countershaft, second gears (26, 27) adapted to be selectively coupled to said first input shaft (29) and meshing with gears (20, 22) on said countershaft, a third gear (60) rotatable on said second input shaft and meshing with a gear (21) on said countershaft, a fourth rotatable gear (56) meshing with a gear (22) on said countershaft, a fifth gear (57) rotatable on said second input shaft and meshing with said fourth gear, means (61, 62) for selectively coupling said third (60) and fifth (57) gears to said second input shaft, an eighth gear (39) adapted for selective coupling to said output shaft (38), a sixth gear (37) fixed to said first input shaft (29) and meshing with said eighth gear, and a seventh gear (37') fixed to said second input shaft (55) and also meshing with said eighth gear.

2. A gear change and reversing transmission according to claim 1 in which said drive shaft means (4) drives said countershaft (18) in one direction, said countershaft being adapted selectively for driving separately said first input shaft (29) in one direction and the second input shaft (55) in opposite directions.

3. A gear change and reversing transmission according to claim 1 in which said fourth (56) and fifth (57) gears drive said second input shaft (55) in reverse direction when said fifth gear (57) is coupled to said second input shaft (55).

4. A gear change and reversing transmission according to claim 1 in which said second gears (26, 27) on said firth input shaft (29) are of respective sizes and mesh with corresponding gears (20, 22) on said countershaft (18) for the selective driving of said first input shaft (29) at either of two velocity ranges.

5. A gear change and reversing transmission according to claim 4 in which the gear (22) on said countershaft which meshes with the larger one of said second gears (27) also meshes with said fourth gear (56).

6. A gear change and reversing transmission according to claim 5 in which the gear (21) on said countershaft which meshes with said third gear (60) rotatable on said second input shaft (55) is disposed axially between the gears (20, 22) on said countershaft (18) which mesh with the said second gears (26, 27) on said first input shaft (29).

7. A gear change and reversing transmission according to claim 1 in which said first gears (14, 19; 15, 20; 16, 21; 17, 22) on said drive shaft means and said countershaft provide for four velocity ranges of said countershaft (18), the gear (21) on the countershaft meshing with said third gear (60) on said second input shaft being that one of said first gears on the countershaft which forms the next to the highest velocity range for the countershaft.

8. A gear change and reversing transmission according to claim 1 in which each of the gears (20, 21, 22) on said countershaft meshing with said second (26, 27), third (60), and fourth (56) gears is one of said first gears.

9. A gear change and reversing transmission according to claim 1 in which each of said first gears (29, 20, 21, 22) on said countershaft is fixed thereto, a first hollow shaft (25) rotatable on said first input shaft (29), said second gears (26, 27) being rotatable on said first hollow shaft (25) and first coupling means (28) for selectively coupling said second gears to said first hollow shaft, a second hollow shaft (58) rotatable on said second input shaft and rotatably supporting said third (60) and fifth (57) gears, second coupling means (62) for selectively coupling said third and fifth gears to said second hollow shaft, and first and second friction clutch means (34, 61) for selectively coupling said first and second hollow shafts to said first and second input shafts.

10. A gear change and reversing transmission according to claim 9 in which each friction clutch (34, 61) is hydraulically engageable and each friction clutch is spring disengageable.

11. A gear change and reversing transmission according to claim 1 in which said second input shaft (55) includes a ninth gear (65) fixed thereto and larger than said seventh gear (37'), a tenth gear (66) rotatable on said output shaft (38) and meshing with said ninth gear, and means (41) for selectively coupling said tenth gear to said output shaft while uncoupling said eighth gear from said output shaft.

12. A gear change and reversing transmission according to claim 11 in which said eighth gear (39) has an eleventh and smaller gear (40) fixed thereto, a third hollow shaft (44), a twelfth gear (42) fixed to the hollow shaft and meshing with said eleventh gear, a thirteenth gear (48) fixed to said third hollow shaft and smaller than said twelfth gear, a fourteenth gear (50) rotatable on said output shaft and meshing with said thirteenth gear, and means (52) for selectively coupling said fourteenth gear to said output shaft.

13. A gear change and reversing transmission according to claim 12 in which said third hollow shaft (44) is coaxial with said drive shaft (4).

14. A gear change and reversing transmission according to claim 12 which includes a further gear (49) fixed to said third hollow shaft (44) and smaller than said thirteenth gear (48), another gear (51) rotatable on said output shaft and meshing with said further gear (49), and means for selectively coupling said other gear (51) and said fourteenth gear (50) to said output shaft (38).

15. A gear change and reversing transmission according to claim 14 in which said tenth gear (66) is disposed on said output shaft axially between said eighth gear (39) and said fourteenth gear (50).

16. A gear change and reversing transmission according to claim 14 which includes a single coupling element (41) between said eighth (39) and tenth (66) gears for selective coupling thereof to said output shaft.

17. A gear change and reversing transmission according to claim 14 which includes a first coupling element 41 between said eighth (39) and tenth (66) gears for selective coupling thereof to said output shaft (38) and a second coupling element (52) between said fourteenth (50) and said other gear (51) for selective coupling thereof to said output shaft (38), and a single control element for said first and second coupling elements.

18. A gear change and reversing transmission according to claim 1 in which said first (29) and second (55) input shafts and said drive shaft means (4) are disposed on a common circle relative to said countershaft (18).

19. A gear change and reversing transmission according to claim 18 in which the axis of rotation of said fourth gear (56) is arranged on the same said circle.

20. A gear change and reversing transmission according to claim 18 in which said output shaft (38) is coaxial with said countershaft (18).

21. A gear change and reversing transmission according to claim 1 in which said drive shaft means (4) includes an inner shaft (46) having a one way drive connection (45) with the prime mover, drive gear means (72, 73) rotatable on said inner shaft, take-off shaft means (68) having driven gear means (78) for driving said take-off shaft means, idler gear means (74, 77) rotatable on said output shaft and meshing with said drive and driven gear means, means (81, 83, 84) for coupling said driven gear means (78) to said take-off shaft means, and means (67) for selectively coupling said drive gear means (72, 73) to said inner shaft.

22. A gear change and reversing transmission according to claim 21 in which said take-off shaft means (68) is on the same circle relative to said countershaft (18) as said inner shaft (46).

23. A gear change and reversing transmission according to claim 21 in which said gear means (72, 73; 78; 83, 84) form multi-velocity ranges for said take-off shaft means.

24. A gear change and reversing transmission according to claim 21 in which said drive gear means include two gears (72, 73) rotatable on said inner shaft (46), and a control member (67) unrotatable on said inner shaft and selectively engageable with said drive gear means.

25. A gear change and reversing transmission according to claim 24 in which said driven gear means includes at least one gear (78) rotatable relative to said take-off shaft means and a friction clutch (81) for selectively coupling said one gear to said take-off shaft means.

26. A gear change and reversing transmission according to claim 24 which includes a larger gear (84) fixed to said take-off shaft means (68), a smaller gear (83) meshing with the larger gear, a first clutch element (82) fixed to the smaller gear, a second clutch element (79) cooperating with the first clutch element, and said driven gear means (78) being fixed to said second clutch element and driven by said idler gear means.

27. A gear change and reversing transmission according to claim 26 which includes an intermediate shaft (80) fixed to said smaller gear (83) and first clutch element (82) and rotatably supporting said driven gear means (78) and second clutch element (79).

28. A gear change and reversing transmission according to claim 27 which includes a second shaft (85) coaxial with said take-off shaft means (68) and gearing (87, 88) connecting said second shaft to said output shaft (38).

* * * * *